United States Patent [19]

McKee et al.

[11] Patent Number: 4,609,265
[45] Date of Patent: Sep. 2, 1986

[54] REARVIEW MIRROR ACTUATING DEVICE

[76] Inventors: Clyde M. McKee, 22175 Bernard St., Taylor, Mich. 48180; Ward Scott, 170 Pinewood Ter., Safety Harbor, Fla. 33572; Henry A. Warren, Morning View Dr., Yorktown Hgts., N.Y. 10598; Dennis G. Scott, 202 E. Third St., Rochester, Mich. 48063

[21] Appl. No.: 685,406

[22] Filed: Dec. 24, 1984

[51] Int. Cl.$^4$ .................................................. G02B 7/18
[52] U.S. Cl. ..................................... 350/605; 350/637; 307/10 R; 318/467
[58] Field of Search ....................... 350/605, 637, 633; 318/467; 307/10 R

[56] References Cited

U.S. PATENT DOCUMENTS

| 2,877,686 | 3/1959 | Foster | 350/633 |
| 3,469,901 | 9/1969 | Cook et al. | 350/605 |
| 3,563,639 | 2/1971 | Bowler | 350/605 |
| 4,295,708 | 10/1981 | Albrecht et al. | 350/637 |

FOREIGN PATENT DOCUMENTS

| 2447752 | 4/1976 | Fed. Rep. of Germany | 350/633 |
| 67539 | 4/1983 | Japan | 350/637 |
| 67538 | 4/1983 | Japan | 350/637 |
| 224829 | 12/1983 | Japan | 350/637 |

Primary Examiner—Jon W. Henry
Attorney, Agent, or Firm—Gifford, Groh, VanOphem, Sheridan, Sprinkle & Dolgorukov

[57] ABSTRACT

An actuating device for automatically controlling the position of a movably mounted vehicle mirror comprises a motor controlled by switches for selectively actuating the motor in response to angular displacement of a trailer with respect to the vehicle. The switches are actuated in response to movement of the trailer and responsively close a circuit connecting a power source to the motor. Preferably, the switching means can include means for disconnecting the power source after a predetermined rotation of the motor in order to avoid excess energy use. Preferably, the disconnecting means comprises a plurality of switches arranged to contact lobes of a rotating cam at predetermined rotational positions of the cam. The cam can be concentrically secured to the rotor shaft or can be connected to the rotor shaft by a lever mechanism in order to form a crank which translates the rotor movement to linear displacement on a mirror positioning member.

7 Claims, 8 Drawing Figures

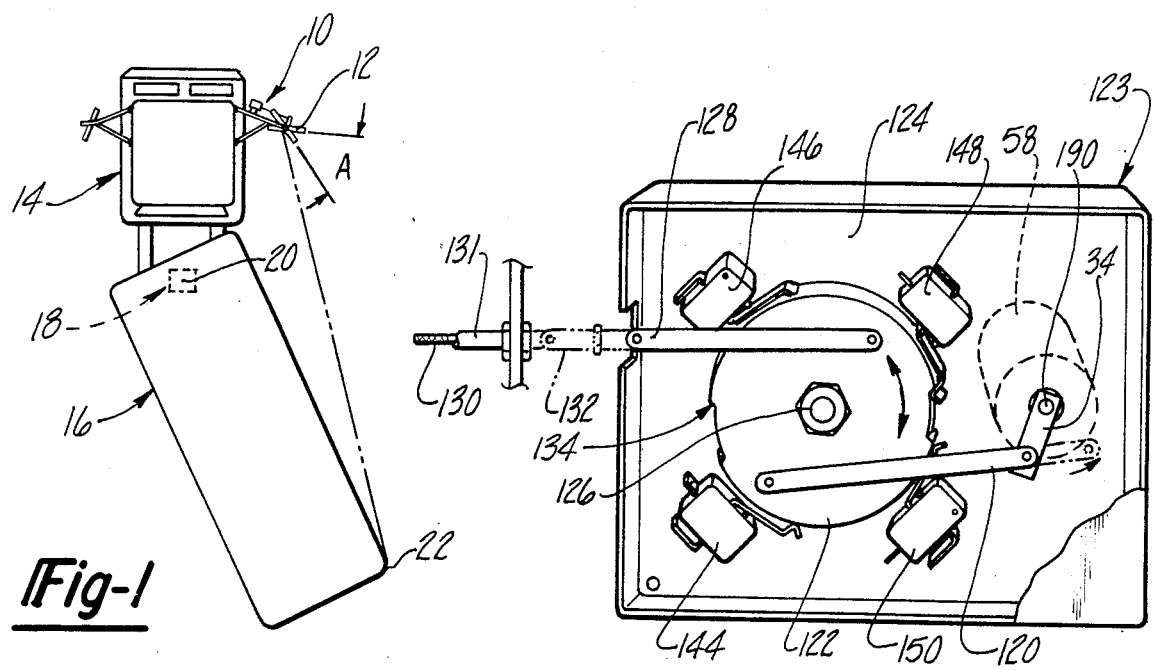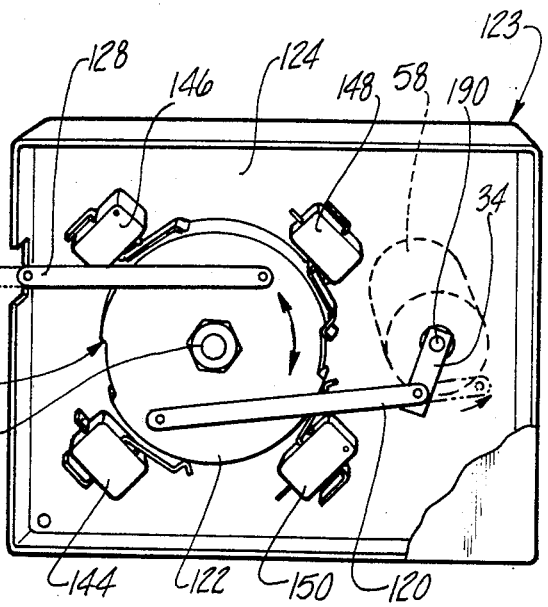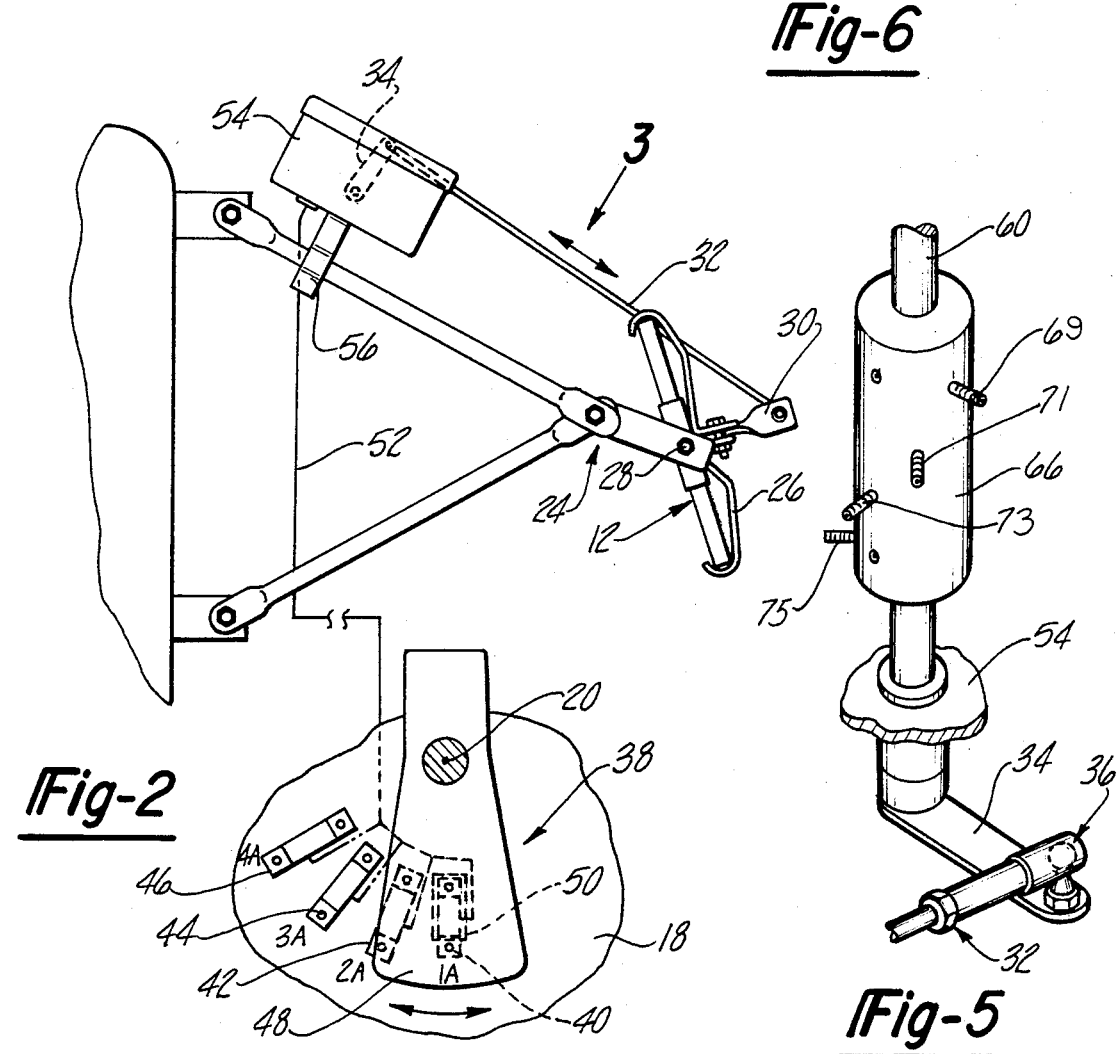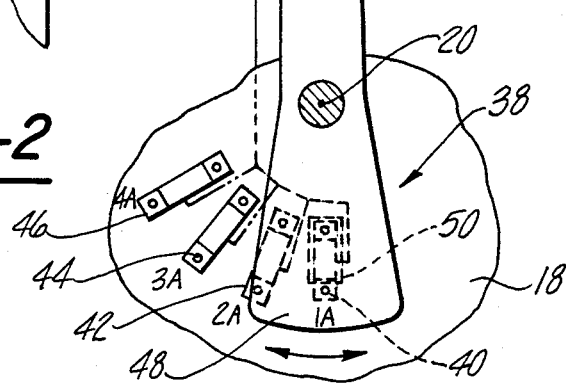

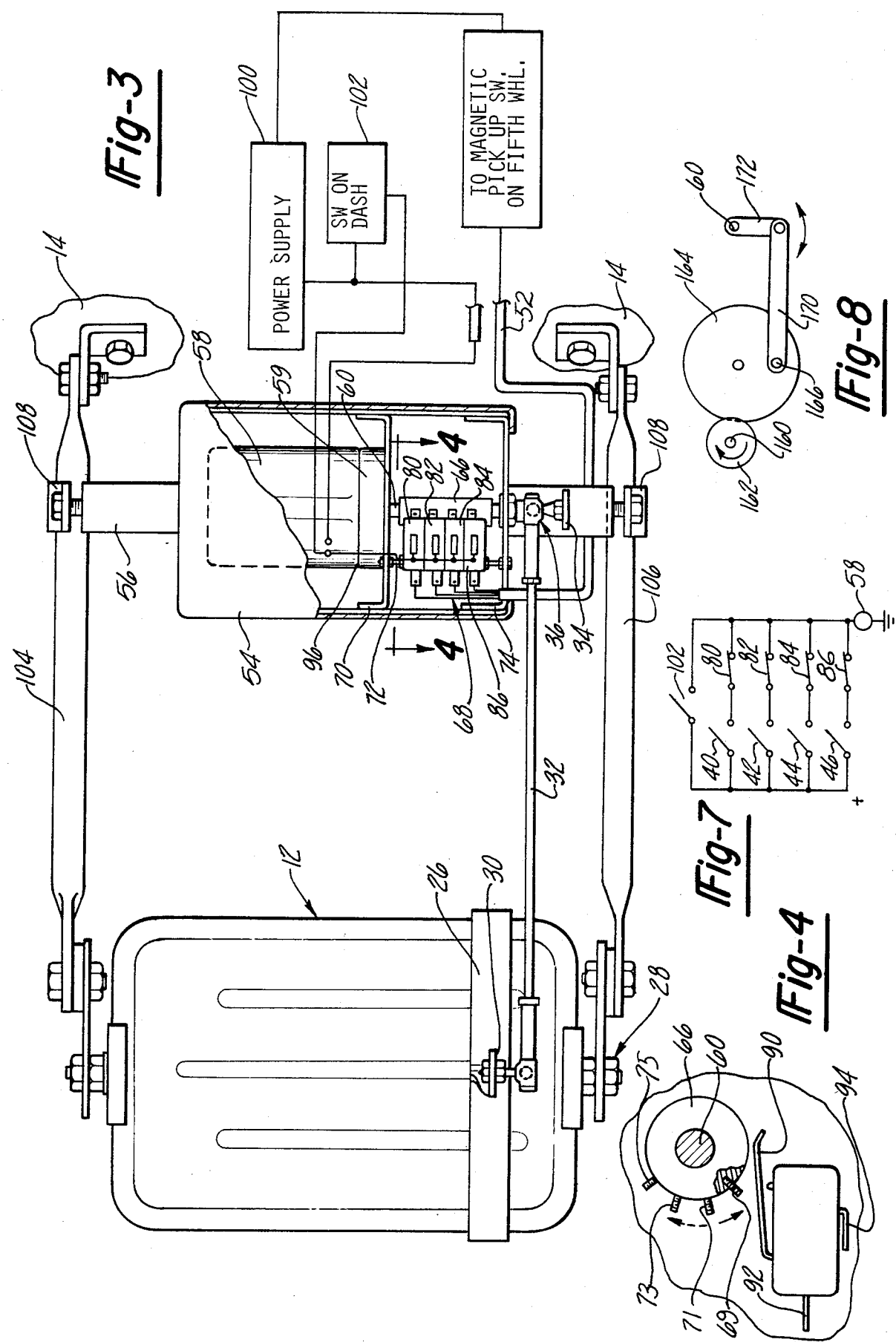

REARVIEW MIRROR ACTUATING DEVICE

BACKGROUND OF THE INVENTION

1. Field of the Present Invention

The present invention relates generally to externally mounted rearview mirrors for vehicles such as tractor-trailer combinations. More particularly, the invention relates to a device for automatically controlling the position of a movably mounted mirror in response to an angular relationship between the vehicle and the trailer being towed by the vehicle.

2. Description of the Prior Art

The maneuvering ability of articulated vehicles, particularly tractor-trailer combinations, is often hampered by the difficulty in quickly and conveniently determining the location of the rear end of the trailer. This difficulty is substantially increased when the trailer is long and turns toward the right side of the vehicle while the turn is being negotiated. Typically, the externally mounted rear view mirrors are positioned for straight ahead driving, and thus, a right handed turn during backing of the vehicle causes the right hand mirror to reflect an image of the side of the trailer and the left hand mirror would be directed outwardly away from the trailer. Similarly, when a left hand turn is being negotiated while the vehicle is being backed up, the left hand mirror is directed against the side of the trailer and the right hand mirror reflects an image outwardly away from the trailer.

Although the driver of a left-handed drive vehicle can view the left rear end of the trailer by peering out the left hand window, when the trailer is turning toward the left, the driver must turn his head an divert his attention away from the front of the vehicle. Moreover, the driver's peripheral vision may not provide immediate perception of events occuring at the front of the vehicle. Moreover, the driver is unable to peer out the right hand window and view the right rear end of the trailer when a right hand turn is being negotiated.

In view of these problems, mirrors have been made to move in response to the orientation of the trailer relative to the vehicle such that the field of view through the mirrors is changed while the turn is being negotiated. Some previously known devices for moving mirrors have been connected to the steering mechanism of a vehicle. Nevertheless, since the rear end of the trailer does not follow the exact route of the steered wheels of the vehicle, the image provided by such a mirror actuating device can often be displaced from the rear end of the trailer.

Another previously known actuating device moves the mirror in response to angular orientation of the trailer with respect to the vehicle. A previously known actuating device of this type is disclosed in U.S. Pat. No. 3,950,080. This patent discloses a mechancial actuating device for automatically changing the orientation of side view mirrors in response to the angular relationship between the trailer and the vehicle at the pivot connection between them. One disadvantage of this previous system is that the longitudinally sliding plates, which provide direct displacement of a mirror actuator, and the pivot mechanism are exposed to environmental conditions which can effect the operation and useful life of the moving parts. Moreover, repeated repair or replacement of the components may be necessary due to the large forces and stresses exerted on the parts, and the forces may also contribute to misalignment of the parts after repeated use.

SUMMARY OF THE PRESENT INVENTION

The present invention overcomes the above-mentioned disadvantages by providing a mirror actuating device comprising a motor driven mirror operator which is actuated by switching shaft to linear translation of a control member for positioning the mirror. These and other details and advantages of the present invention are discussed in detail in the following detailed description of the preferred embodiment of the present invention.

BRIEF DESCRIPTION OF THE DRAWING

The present invention will be more clearly understood by reference to the following detailed description of the preferred embodiment of the present invention when read in conjunction with the accompanying drawing, in which like reference characters refer to like parts throughout the views and in which:

FIG. 1 is a top plan view of a tractor-trailer combination employing a mirror actuating device of the present invention;

FIG. 2 is a broken, enlarged fragmentary top plan view of portions of the device illustrated in FIG. 1;

FIG. 3 is a front view of the mirror actuating device shown in FIGS. 1 and 2 with portions removed for the sake of clarity;

FIG. 4 is an enlarged sectional view taken substantially along line 4—4 in FIG. 3;

FIG. 5 is a perspective view of portions of the device shown in FIGS. 3 and 4;

FIG. 6 is a perspective view of portions of the actuating device in accordance with the present invention but showing a modification thereof;

FIG. 7 is a schematic view of the switching network of the actuating device according to the present invention; and FIG. 8 is a diagrammatic view of a transmission employed in of the actuating device according to the present invention.

DETAILED DESCRIPTION OF A PREFERRED EMBODIMENT OF THE PRESENT INVENTION

Referring first to FIG. 1, a mirror actuating means 10 is thereshown for positioning the mirror 12 on a truck or tractor 14. The trailer 16 is pivotally secured in a well known manner, to the tractor 14 by a fifth wheel arrangement generally designated at 18. The trailer pivots about an axis 20 with respect to the tractor 14. The mirror actuating means 10 permits the mirror 12 to reposition at a particular angle A with respect to its normal straight ahead driving position so that the mirror reflects an image of the rear end 22 of the trailer 16 to a driver located in the tractor 14. Although as shown in the drawing, actuating means 10 is particularly adapted for positioning the right hand rearview mirror 12, it will be understood that a simultaneous or complementary actuating of the left hand rearview mirror is also considered to be within the scope of the invention. Nevertheless, for the sake of clarity and brevity, a single description as to movement of a single mirror is sufficient to permit skilled artisans to employ the device with mirrors mounted on either side of the vehicle.

Referring now to FIG. 2, an enlarged more detailed view of the mirror 12 and actuating means 10 is provided. A frame 24 pivotally supports a mirror support bracket 26 so that the mirror is pivotal about an axis generally indicated at 28. A lever bracket 30 extends radially outwardly from pivot axis 28 and includes means for pivotally securing the end of a rigid positioning arm 32 thereto. The positioning arm 32 is in turn pivotally secured at its other end to an end of a lever arm 34.

As best shown in FIG. 5, a ball and socket joint 36 forms an appropriate pivot joint for connecting the positioning arm 32 to the lever arm 34. The lever arm 34 is rotated about its other end by a motor as will be described in greater detail hereinafter. However, the operation of the motor is governed by switching means generally designated at 38 in FIG. 2. A plurality of switches 40, 42, 44 and 46, which are magnetically responsive and encased within a non-magnetic material, are mounted to the fifth wheel 18. A switch actuating arm 48 is secured to the trailer 16 so that it pivots in unison with the trailer about the pivot axis 20. A magnet 50 is mounted on the actuating arm 48 so as to be juxta-positioned with one of the switches 40-46 depending on the pivot position of the trailer 16 with respect to the trailer 14. For example, when the tractor and trailer are aligned in the straight ahead position, the magnet 50 closes the switch 40. Pivoting of the trailer 16 with respect to the tractor 14 in the direction shown in FIG. 1 causes successive alignment of the magnet 50 with the switches 42, 44 and 46 depending on the angle of the trailer 16 with respect to the tractor 14, and successively closes each of the switches 40, 42, 44 and 46. Each of the switches 40, 42, 44 and 46 is wired by a multi-line wire 52 to the motor within housing 54 in a manner to be described in greater detail hereinafter. As also shown in FIG. 3, motor housing 54 is secured by a bracket 56 to the frame 24 supporting the mirror 12.

Referring now to FIG. 3, a motor housing 54 is thereshown supporting a motor 58 including a transmission means 59 for reversably driving a rotor shaft 60. The motor housing 54 can be conveniently constructed in the same manner as previously known windshield wiper motor mechanisms. As shown in FIG. 8, the motor 58 (not shown) has a driven motor shaft 160 to which a drive gear 162 is secured for rotation. A substantially larger driven gear 164 is rotatably mounted to mesh with the drive gear 162, and it will be understood that the driven gear 164 rotates substantially slower than the drive gear 162. The driven gear 164 includes an eccentrically mounted pivot pin 166 for pivotally securing one end of a driving link 170 to the driven gear 164. The other end of the link 170 is pivotally secured to an end of lever arm 172. The other end of lever amr 172 is fixedly secured to the rotor shaft 60 which is rotatably supported by partition plate 70 so that the rotor shaft 60 oscillates with the lever arm 172 as indicated by the arrow shown in FIG. 8 when the motor shaft 160 rotates.

Rotor shaft 60 extends through the bottom wall 74 of the housing 54 (see FIGS. 3 and 5) and is fixedly secured to an end of the lever arm 34. Intermediate the motor 58 and lever 34, and within the housing 54, a cam 66 is concentrically secured to the rotor shaft 60 adjacent a switch bank 68. A partition plate 70 supports the motor 58 and rotor shaft 60 in a fixed relationship with respect to the switch bank 68. The switch bank 68 is also locked to the partition plate 70 by a through bolt 72 locked between the partition plate 70 and the bottom plate 74 of the motor housing 54 by locking the plates between nuts threadably engaged with bolt 72.

As best shown in FIG. 5, the cam 66 comprises a cylindrical body having a plurality of projections or cam lobes 69, 71, 73 and 75. Each lobe is axially spaced from an adjacent lobe so as to correspond with the position of a switch within the switch bank 68. Moreover, the lobes are circumferentially spaced from adjacent lobes so as to engage a corresponding switch at a predetermined rotational position of the rotor shaft 60. Thus, referring again to FIGS. 3 and 5, the top switch 80 is positioned for engagement by the lobe 69 at a first rotary position of the rotor shaft 60, the second switch 82 is positioned for engagement by the lobe 71 at a second predetermined rotational position of the rotor shaft 60, a third switch 84 is positioned for engagement by lobe 73 at a third predetermined rotational position of rotor shaft 60, and, finally, a fourth switch 86 is positioned for engagement by the lobe 75 in a fourth predetermined rotational position of the rotor shaft 60. As best shown in FIG. 4 the lobes depress a switch lever 90 which serves to open the normally closed switches 80, 82, 84 and 86 to interrupt electrical connection between the switch terminals 92 and 94 of each switch.

The multi-line wire 52 includes separate conductors, each conductor attached to a switch terminal 92 on one of the switches 80, 82, 84 or 86 in switch bank 68. All of the switch terminals 94 are connected by a single conductor 96 to a contact terminal of the motor 58. The other contact terminal of the motor 58 is connected to a power supply 100 through a manual on/off switch 102 mounted on the dashboard (not shown) of the tractor 14.

The motor housing 54 can be conveniently attached to the frame 24 for supporting the rearview mirror 12. As shown in FIG. 3, the bracket 56 extends between an upper support arm 104 and a lower support arm 106 of the frame 24. Locking brackets 108 are bolted to the ends of the bracket 56 about the support arms 104 and 106. Thus, the motor housing 54 is fixedly positioned with respect to the mirror pivot axis 28 so that rotation of the rotor shaft 60, and thus rotation of the lever 34 displaces the positioning arm 32 so as to pivot the bracket 30 about the axis 28 and reposition the mirror 12.

The structure discussed above operates, in general, to provide alignment of the mirror 12 to reflect the image of the rear end 22 of the trailer 16 by sensing the angular orientation of the trailer 16 with respect to the tractor 14 and actuating the motor 58 (not shown) through a predetermined incremental rotation. More particularly, when the trailer 16 is aligned in the straight ahead position with respect to the tractor 14, the magnet 50 on pivot arm 48 is aligned with magnetic switch 40 on the fifth wheel 18 of the vehicle. As the trailer 16 becomes angled with respect to the tractor 14 in the direction shown in FIG. 1, the pivot arm 48 moves into alignment with the magnetic switch 42, thus closing the circuit between the power supply 100 and the motor 58. As the rotor shaft 60 rotates, the lever arm 34 retracts the positioning arm 32 (to the right in FIG. 3) thus reorienting the mirror 12 and rotating cam 66 until lobe 71 contacts and opens switch 90, thus breaking the circuit and stopping the motor 58 and rotation of rotor shaft 60. As the trailer 16 pivots further in the direction shown in FIG. 1, the magnet 50 becomes aligned with and successively activates the magnetic switches 44 and 46, while the switches 84 and 86 limit the degree of rotation of the rotor shaft 60.

During reverse pivoting of the lever arm 48 as the trailer 16 returns toward straight alignment with the tractor 14, the magnet 50 successively reactivates switches 44, 42 and 40 in a reversed sequence. As a result, although the rotor shaft 160 motor further in the same direction it previously moved, the eccentric pin 166 on driven gear 164 moves from the position shown in FIG. 8. As a result, the link 170 and lever arm 172 cause the rotor shaft 60 to rotate in an opposite direction, to its previous movement, thus incrementally returning the mirror 12 toward a normal straight ahead driving position which reflects an image of the area immediately to the rear of the vehicle. It will also be understood that if the movement of the trailer 16 is less than the full angular cycle the mirror 12 is indexed to the appropriate angular position. For example, if the trailer 16 stops angling when the magnet 50 is aligned with switch 44 and then returns toward the position where magnet 50 is aligned with switch 42, the closing of switch 42 actuates the motor 58 until the switch 82 is opened by its respective cam lobe 71. Accordingly, the mirror 12 travels through a complete cycle until it is positioned in proper alignment.

In addition, the mirror 12 can be positioned as desired by a dashboard mounted, push button switch 102. As shown in FIGS. 3 and 7, the push button switch directly connects motor 58 to the power supply 100 so that the angle of the mirror 12 can be adjusted regardless of the relative positions of the trailer 16 and the tractor 14.

Referring now to FIG. 6, a modification of the actuating system is thereshown wherein the motor 58 has a substantially shorter motor shaft 190 to which a lever 34 is secured for rotation therewith. The other end of the lever 34 is pivotally connected to a lever arm 120 whose other end is pivotally secured eccentrically to the cam member 122. The cam 122 is rotatably mounted to the housing plate 124 by a central axle 126. A second lever arm 128 is pivotally secured at one end eccentrically to the cam 122. The other end of the lever 128 is secured to a cable 130. The cable 130 slidably displacable within its sheath 131, is in turn secured to the pivot bracket 30.

In addition, the cam 122 includes a peripheral cam surface 134 having a plurality of lobes. A plurality of switches are secured about the periphery of the cam so that the lobes are adapted to engage switches 144, 146, 148 and 150, respectively at predetermined rotational positions of the cam 122. While the cam lobes and switches 144, 146, 148 and 150 cooperate substantially in the same manner as cam 66 and switch bank 68, it will be understood that the cam 122 also forms a crank which translates rotary motion of the motor 58 to the linear motion of the mirror adjusting cable 130. In particular, each actuation of a magnetic switch at the fifth wheel 18 energizes the motor 58 and the lever arm 34 to cause a partial rotation of the cam 122 until a lobe raises the lever of the corresponding switch 144. Similarly, successive actuation of the magnetic switches at the fifth wheel 18 produce further rotations of the cam 122 until the next consecutive cut-off switch 146 is engaged by the cam lobe at a predetermined rotational position of the cam 122. In addition, rotation of the cam 122 causes the lever arm 128 to retract within or extend outwardly from the housing 123, thus retracting or extending the cable 130, resulting in reorientation of the mirror 12.

Thus the present invention provides a mirror actuating means which automatically repositions the mirror for observing the rear end of the trailer during turning of the vehicle and trailer combination. Thus, the driver's view of obstacles at the rear of the trailer while the vehicle is being backed up is not obscured by movement of the trailer, but rather, is enhanced by automatic reorientation of the mirror to provide a view at the rear of the trailer. Moreover, automatic movement of the mirror is limited to discrete increments so that energy is used effectively and only when the mirror position is to be changed in response to pivoting of the trailer. Moreover, substantially all components, are covered or housed so as to be protected from environmental conditions which can affect the life and the parts of the operability of the mirror actuating means.

Having thus described our invention, many modifications thereto will become apparent to those skilled in the art to which it pertains without departing from the scope and spirit of the present invention as defined in the appended claims.

What is claimed is:

1. An actuating device for automatically controlling the position of a movably mounted vehicle mirror in response to relative positioning of the vehicle with respect to a trailer pivotally mounted to the vehicle about a pivot axis, said device comprising:

mirror actuating means comprising a motor and means for moving said mirror upon actuation of said motor;

an electrical power source for said motor;

first switch means for actuating said motor in response to the pivoting movement of the trailer with respect to the vehicle;

second switch means for de-actuating said motor in response to a predetermined movement of said motor, said second switch means comprising a cam, means for rotating said cam in response to actuation of said motor, said cam having a plurality of lobes corresponding in number to the number of said plurality of first switches, a plurality of second switches, and means for positioning each of said second switches about said cam for engagement with one of said lobes at a predetermined rotary position of said cam; and means for electrically connecting said power source to said motor through said first and second switching means.

2. The invention as defined in claim 1 wherein said motor comprises an electric rotary motor having a rotor and transmission means for converting the rotary motion of said rotor to an oscillating shaft motion including an oscillating shaft.

3. The invention as defined in claim 1 wherein said first switch means comprises a plurality of switches positioned concentrically about the pivot axis, and secured to one of the trailer and vehicle, and a pivot member having means for magnetically closing each switch when juxta-positioned with each switch, said pivot member being secured to the other of the trailer and vehicle.

4. The invention as defined in claim 1 wherein said motor includes an oscillating shaft and wherein said cam is concentrically secured to said oscillating shaft.

5. The invention as defined in claim 1 wherein said means for rotating said cam comprises lever means concentrically secured to said cam.

6. The invention as defined in claim 1 wherein said means for actuating said motor comprises a plurality of switches positioned concentrically about the pivot axis of the pivoting connection between the trailer and the vehicle, and means for actuating said switches in response to pivoting movement of said trailer.

7. The invention as defined in claim 1 and further comprising override means for selectively actuating said motor regardless of the position of said trailer with respect to said vehicle.

* * * * *

UNITED STATES PATENT AND TRADEMARK OFFICE
CERTIFICATE OF CORRECTION

PATENT NO. : 4,609,265
DATED : September 2, 1986
INVENTOR(S) : Clyde M. McKee et al It is certified that error appears in the above—identified patent and that said Letters Patent are hereby corrected as shown below:

Column 3, line 51, delete "amr" and insert --arm--.

Column 5, line 5, delete "rotor" and insert --motor--.

Column 5, line 5, delete "motor" and insert --rotates--.

Column 5, line 37, delete "the". (third occurrence)

Signed and Sealed this

Tenth Day of February, 1987

Attest:

DONALD J. QUIGG

Attesting Officer

Commissioner of Patents and Trademarks